Patented Jan. 7, 1941

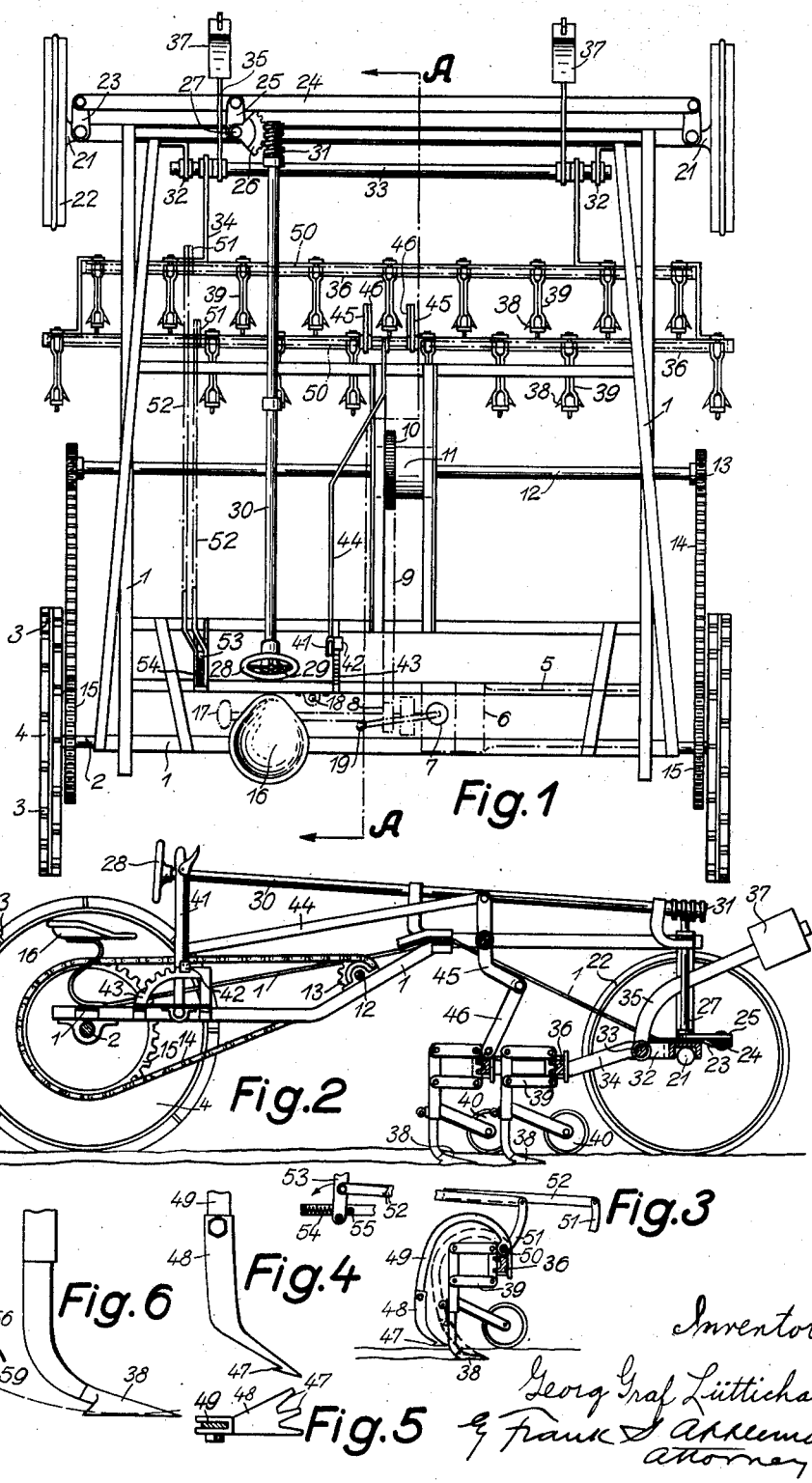

2,228,172

UNITED STATES PATENT OFFICE 2,228,172

HOEING MACHINE

Georg Graf Lüttichau, Prausnitz, Bezirk Liegnitz, Germany

Application August 30, 1939, Serial No. 292,702
In Germany September 27, 1938

3 Claims. (Cl. 97—47)

This invention relates to a hoeing machine provided with power-driven rear wheels and means permitting the operation of the machine by one person.

The known types of hoeing machines equipped with power drive for the rear wheels follow in their design that of animal-drawn machines and are so constructed that one person guides the front part of the machine and operates the driving engine and a second person conducts the laterally and vertically movable hoeing frame attached to the machine behind the rear wheels, takes care of adjusting the cutters as to the proper working depth and position relative to the rows and must also periodically remove the weeds collecting on the cutters.

It is the object of the invention to improve a hoeing machine fitted with power-driven rear wheels so that only one person is required for operation, and this end is attained by arranging the hoeing frame between the front wheels controlled by an automobile steering device from the driver's seat near the rear axle and the power-driven rear wheels so as to be laterally non-displaceable relative to the front wheels and providing at the driver's seat besides the wheel for steering the front wheels and guiding the shares or cutters and the engine operating means a lever for vertically adjusting the hoeing frame which is articulated to the rigid front part of the machine frame and fitted with balance weights.

To remove the weeds from the cutters or shares a lever is disposed near each cutter, which is usually retracted but may be moved toward the cutter together with means for gripping weeds that have collected in front of the cutter, and all these levers are controlled from the driver's seat by a manually operable rocking lever which is returned to inoperative position by spring action. The means for removing the weeds from the cutters are preferably formed as tongs whose jaws shut during forward motion of the levers and open during the return motion when they are out of range of the cutters.

The invention is illustrated by way of example in the accompanying drawing, in which Figure 1 is a plan view of the hoeing machine according to the invention with the weed removing means omitted;

Fig. 2 is a longitudinal section of the machine on the line A—A, of Fig. 1;

Fig. 3 is a side view of the weed removing means;

Figs. 4 and 5 are, respectively, a side and top view on an enlarged scale of the lower portion of a weed stripper; and Fig. 6 is a side view, partly in section, of a modified weed removing device.

The machine frame 1 formed of section irons is provided at its rear end with a shaft 2 supporting the power-driven rear wheels 4 preferably provided with gripper tires 3. Drive is effected by an internal combustion engine 5 disposed on the rear cross struts of the frame 1, which is provided with a coupling clutch 6 and a two speed control gear 7 and which drives the sprocket 10 of a differential gear 11 by means of a pinion 8 and a chain 9. Two countershafts 12, 12 of the differential gear 11 are suitably disposed in the center of the frame 1, and each end thereof projecting beyond the sides of the frame 1 is keyed to a sprocket 13, the two sprockets 13 forming the driving wheels of the chain drives acting upon the two rear wheels 4 and comprising each a chain 14 and a sprocket 15 secured to the inside of each rear wheel 4.

The operating levers for the driving engine 5 are arranged as in motor-driven vehicles near a seat 16 on the rearmost cross strut of the frame 1. To the left of the seat 16 a pedal 17 for operating the clutch 6 is positioned, and to the right a gas pedal 18 and a manually operable gear shifting lever 19 are provided. As these parts are generally known, they are indicated in the drawing merely by dot and dash lines. For clearness' sake, chain guards are also omitted in the drawing, which must of course be provided in the actual construction and may be of known type.

The frame 1 is higher in front than in the rear and possesses a vertically descending front portion 20 fitted with stub axles 21, 21 for the two steerable front wheels 22, 22. By being articulated through rectangularly projecting levers 23 to a joint cross rail 24 both stub axles 21, 21 are so coupled that they can be simultaneously and uniformly moved together with the front wheels 22, 22 which are smaller than the rear wheels 4. The cross rail 24 is engaged by a lever 25 which is positioned on a shaft 27 vertically arranged in the frame 1 and carrying on top a steering worm sector 26. A steering wheel 28 in front of the seat 16, which is fitted with a fixable hand-operated gas lever 29 in addition to the gas pedal 18 near the seat, serves for operating the sector 26 by means of a steering column 30 and a steering worm 31 to shift the cross rail 24 to the right or left in consequence whereof the front wheels 22, 22 are deflected accordingly and the machine changes its direction of travel.

On the rear side of the descending front portion of the frame 1 two bearings 32 support a rotatable shaft 33 to which two pairs of levers 34, 35 are non-rotatably secured. The two rearwardly directed levers 34 support a hoeing frame 36 whilst the levers 35 obliquely extending in forward and upward direction are provided with preferably adjustable balance weights 37 which permit raising of the frame 36 at the expenditure of relatively little force. The frame 36 is vertically adjustable relative to the machine frame 1 to facilitate starting and stopping of the cutters or shares 38 or regulation of their working depth but cannot be moved sideways relative to the frame as it is rigidly secured to the strong levers 34. The cutters 38 are accurately guided as to the rows solely by the steering action of the front wheels 22, 22, though the cutters 38 are adjustably disposed in known manner on the frame 36 for adaptation to different spacing of rows.

In the construction shown the hoeing frame 36 comprises two channel irons disposed one after the other and held together by cross rails, and the cutters 38 forming two rows staggered relative to each other are attached to the channel irons by means of a known parallelogram guide 39, each parallelogram 39 being the usual way fitted with a guide roll 40 which travels in front of the cutter 38 detachably secured to the parallelogram by a clamping screw.

The hoeing frame 36 is adjusted as to height by means of a lever 41 disposed near the seat 16 and movable along a segment 43 by a pawl 42. The manually operable lever 41 couples through an articulated rod 44 two upright levers 45 movably arranged on the machine frame 1, the lower forwardly bent ends of which support two chains or, as shown, two shorter articulated levers 46 which engage two suspension or hinge points at the rear channel iron of the frame 36 to support the frame. It will be seen that by turning back the lever 41 the frame 36 will be raised from the ground and that reversal of the lever motion causes lowering of the frame. The supporting levers or arms 34 of the frame 36 rotate with the shaft 33 while the levers 35 supporting the balance weights 37 are simultaneously raised or lowered, so that the cutters 38 can be brought into operative or inoperative position and adjusted as to working depth without any effort by a person occupying the seat 16 who needs only one hand for carrying out these operations.

This one-man machine is completed by the provision of a device for the periodic removal of weeds collecting on the cutters 38, which can also be operated from the seat 16. In the construction shown in Figs. 3, 4 and 5 a three-fingered stripper 48 provided with barbs 47 is for this purpose positioned to the right of each cutter 38, which can be moved out of the inoperative position indicated in solid lines in Fig. 3 into the operative position shown in broken lines to cause the fingers 47 to move into the weeds disposed in front of the cutter 38. During return of the stripper into initial position the weeds are entrained and after repeated to and fro motion of the stripper levers completely removed from the cutters. The strippers 48 are adjustably and detachably arranged on rearwardly curved levers 49 non-rotatably secured to two continuous shafts 50 of the frame 36. Each shaft 50 is further provided with an upright lever 51 articulated to the front end of a rod 52 whose rear end is articulated to a cross pin of a swinging lever 53 positioned near the seat 16 on the machine frame 1. When the lever 53 is turned back against the action of a spring 54, both rods 52, 52 are simultaneously rearwardly displaced in the direction of the arrow shown in Fig. 3 whereby the strippers 47, 48 are brought into operative position indicated by broken lines. The hand lever 53 is then returned to initial position by the cooperation of the spring 54 and supported by a fixed stop 55. By repeatedly moving the lever 53 to and fro the operator in the seat 16 can completely remove weeds from the cutters 38 without requiring any assistance and without interrupting the operation of the machine. The strippers 47, 48 do not interfere in any manner with the raising of the frame 36 as ample opportunity of motion is insured by the flexible connection of the rods 52 with the operating lever 53 and of the levers 51 with the rods 52.

Fig. 6 shows a construction of the strippers in the form of tongs whose jaws 56 in the normal retracted position of the stripper levers 49 are each held in spread position ready for operation by a double conical spring 57 which is not so easily affected by foreign matter. When the hand lever 53 is operated and by a linkage of the type described the stripper levers 49 with the tongs 56, 56 are caused to slide forward in oblique direction, the lower jaw 56 engages the right-hand side of the cutter or a special guide face thereof. The two jaws 56, 56 of each pair of tongs are united by a pair of toggles 58 the vertex of which is provided with a slot guide 59 in consequence whereof the two jaws 56, 56 of each pair of tongs are uniformly shut during further motion of the levers 49 and grip the weeds in front of the stem of the cutter, which during return of the levers 49 are drawn to the rear and finally released behind the stem when at the upward motion of the levers 49 the tongs are lifted off from the cutters and the jaws 56, 56 are spread apart again by the springs 57.

In a machine constructed in the manner described the driver has all means required for starting and operating the engine within easy reach and, moreover, can quickly raise the hoeing frame or adjust it to proper working depth of the cutters without much effort. As contrary to the usual constructions the hoeing frame is not laterally movable but attached to the machine frame so as to be non-displaceable sideways, the cutters are guided along the rows exclusively by the steering of the front wheels from the driver's seat arranged so that the operator has a free view of the hoeing frame with its shares and of the area to be worked. Proper guiding of the tools can thus be readily effected by operating the steering wheel in front of the driver's seat, and one man, without requiring any help, may start, operate, turn and adjust the machine, so that the second man needed at present may do other work. Furthermore, the new construction does not subject the single operator to excessive strain, because the machine is so designed and arranged that the man in the driver's seat can carry out all necessary operations without undue exertion.

The invention is not restricted of course to the embodiment shown but may be varied in many ways, particularly with respect to the known details of the machine, without deviating from the principle thereof.

I claim:

1. A four-wheeled power-driven hoeing machine having a frame and rear and front wheels, said rear wheels being carried by a rear wheel axle, a driver's seat supported over said rear wheel axle, a steering device operable to control the front wheels from said driver's seat, tool supporting means carried by said frame between the front and rear wheels, hoeing tools carried by said means, and counter-balance weights supported from said frame for counter-balancing the weight of the hoeing tools and the supporting means therefor, said frame being a skeleton frame and the driver's seat being laterally offset from the longitudinal center line thereof whereby the tools may at all times be observed from the driver's seat.

2. A four-wheeled hoeing machine for operation by one person, comprising in combination a machine frame, front and rear axles and wheels, a power drive for the rear wheels, a driver's seat arranged near the rear axle, a steering gear for the front wheels operated from said seat, a hoeing frame arranged between the front and rear wheels and articulated to the rigid front portion of the machine frame so as to be laterally non-displaceable relative to the front wheels, a plurality of adjustable cutters arranged on said hoeing frame, an adjusting lever provided at said seat for vertically displacing the hoeing frame, balance weights for said frame, a displaceable lever provided with means for gripping the weeds accumulating in front of each cutter and disposed near each cutter, and a hand operated swinging lever for the simultaneous actuation of said levers operable from the driver's seat, said swinging lever being returnable into inoperative position by spring action.

3. A four-wheeled hoeing machine for operation by one person, comprising in combination a machine frame, front and rear axles and wheels, a power drive for the rear wheels, a driver's seat arranged near the rear axle, a steering gear for the front wheels operated from said seat, a hoeing frame arranged between the front and rear wheels and articulated to the rigid front portion of the machine frame so as to be laterally non-displaceable relative to the front wheels, a plurality of adjustable cutters arranged on said hoeing frame, an adjusting lever provided at said seat for vertically displacing the hoeing machine, a displaceable lever provided with means for gripping the weeds accumulating in front of the cutters and disposed near each cutter, and a hand-operated swinging lever for the simultaneous actuation of said levers operable from the driver's seat, said swinging lever being returnable into inoperative position by spring action, said means for gripping the weeds comprising tongs whose jaws shut during forward motion of said levers and open again during withdrawal thereof on being out of range of the cutters.

GEORG GRAF LÜTTICHAU.